US009176566B2

(12) United States Patent
Okazaki (10) Patent No.: US 9,176,566 B2
(45) Date of Patent: Nov. 3, 2015

(54) CONTROLLING SUPPLY OF POWER TO A COMMUNICATION UNIT OF A COMMUNICATION DEVICE BASED ON USER'S ACTIVITY OF IMAGE CAPTURING AND TRANSFERRING ON THE COMMUNICATION DEVICE (71) Applicant: Panasonic Corporation, Osaka (JP)

(72) Inventor: Yoshinori Okazaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 283 days.

(21) Appl. No.: 13/783,464

(22) Filed: Mar. 4, 2013

(65) Prior Publication Data
US 2013/0232355 A1 Sep. 5, 2013

(30) Foreign Application Priority Data

Mar. 5, 2012 (JP) ................................ 2012-047636

(51) Int. Cl.
*H04N 5/222* (2006.01)
*G06F 1/32* (2006.01)
(52) U.S. Cl.
CPC ............ *G06F 1/3234* (2013.01); *G06F 1/3209* (2013.01); *G06F 1/3278* (2013.01); *Y02B 60/126* (2013.01)
(58) Field of Classification Search
USPC ........................................................ 370/311
See application file for complete search history.

(56) References Cited

U.S. PATENT DOCUMENTS

| 7,505,795 | B1 * | 3/2009 | Lim et al. ....................... 455/574 |
| 7,650,144 | B2 * | 1/2010 | Nakamura et al. ............ 455/420 |
| 7,669,070 | B2 * | 2/2010 | Asmi et al. .................... 713/324 |
| 2002/0025839 | A1 | 2/2002 | Usui |
| 2006/0069711 | A1 | 3/2006 | Tsunekawa et al. |
| 2006/0187316 | A1 * | 8/2006 | Teramoto et al. .......... 348/231.3 |
| 2007/0037526 | A1 * | 2/2007 | Estable ........................ 455/74.1 |
| 2007/0058074 | A1 * | 3/2007 | Yamagishi ................... 348/372 |
| 2008/0045178 | A1 | 2/2008 | Venkatachalam |

(Continued)

FOREIGN PATENT DOCUMENTS

| JP | 2001-298780 | 10/2001 |
| JP | 2003-250119 | 9/2003 |

(Continued)

OTHER PUBLICATIONS

Mikael Ricknas, Atheros Turns Cell Phone Into Access Point, Jan. 10, 2009, IDG News Service.*

*Primary Examiner* — Abdullah Al Kawsar
(74) *Attorney, Agent, or Firm* — Panasonic Patent Center (57) ABSTRACT

A communication device includes a communicating unit that communicates with another electronic device, and a controller that intermittently controls the supply of power to the communicating unit by keeping the supply of power to the communicating unit during a first time period and stopping the supply of power to the communicating unit during a second time period, and determines whether the other electronic device is connected to the communication device within the first time period. When the other electronic device is connected within the first time period, the controller keeps the supply of power to the communicating unit. When the other electronic device is not connected within the first time period, the controller stops the supply of power to the communicating unit during the second time period after the first time period elapses.

12 Claims, 5 Drawing Sheets

(56) References Cited

U.S. PATENT DOCUMENTS

| | | | |
|---|---|---|---|
| 2008/0273109 A1* | 11/2008 | Bamford | 348/333.02 |
| 2008/0284855 A1* | 11/2008 | Umeyama et al. | 348/207.1 |
| 2009/0124301 A1 | 5/2009 | Raissinia | |
| 2009/0218957 A1* | 9/2009 | Kraft et al. | 315/291 |
| 2012/0327225 A1* | 12/2012 | Barley et al. | 348/143 |
| 2013/0223308 A1* | 8/2013 | Chandra et al. | 370/311 |

FOREIGN PATENT DOCUMENTS

| | | |
|---|---|---|
| JP | 2006-025249 | 1/2006 |
| JP | 2009-544231 | 12/2009 |
| JP | 2010-245692 | 10/2010 |
| JP | 2011-504330 | 2/2011 |
| JP | 2011-199700 | 10/2011 |
| WO | 2008/011301 | 1/2008 |
| WO | 2009/062116 | 5/2009 |

\* cited by examiner

CONTROLLING SUPPLY OF POWER TO A COMMUNICATION UNIT OF A COMMUNICATION DEVICE BASED ON USER'S ACTIVITY OF IMAGE CAPTURING AND TRANSFERRING ON THE COMMUNICATION DEVICE

BACKGROUND

1. Technical Field

The present disclosure relates to a communication device and a method for communicating information such as image data.

2. Related Art

Recently, communication devices having a communication function have become widespread. The communication device needs to supply power to a communication module which is provided for communicating with the other communication device. However, in cases where a communication device cannot find its communication counterpart, the power supplied to the communication module is wasted even though the communication device does not communicate with any communication device. To address such a problem, Japanese Patent Laid-Open No. JP2010-245692A discloses a technique for performing an intermittent infrared communication in a standby state of a cellular phone to suppress power consumption.

In the terminal as described in Japanese Patent Paid-Open No. JP2010-245692A does, the communication device performs one-to-one communication in the infrared communication. On the other hand, there is also a need to suppress unnecessary power consumption in a device which communicates with a plurality of devices (one to N communication) such as a communication device having an access point function. However, it is highly more likely that such a device has established a communication with another device. Thus there is a need for any technique to solve the above described problem in the communication with a plurality of devices.

SUMMARY

The present disclosure is provided in view of the aforementioned problem and has an object of providing a communication device which more surely enables a communication with another communication device while saving power consumption even when communicating with a plurality of other communication devices.

A communication device according to the present disclosure includes a communicating unit configured to communicate with another electronic device, and a controller configured to control supply of power to the communicating unit. The controller intermittently controls the supply of power to the communicating unit by supplying power to the communicating unit during a first time period and stopping the supply of power to the communicating unit during a second time period. The controller determines whether the other electronic device is connected to the communication device through the communicating unit within the first time period. When the other electronic device is connected to the communication device through the communicating unit within the first time period, the controller keeps the supply of power to the communicating unit. When the other electronic device is not connected to the communication device through the communicating unit within the first time period, the controller stops the supply of power to the communicating unit during the second time period after the first time period elapses.

According to the present disclosure, a communication device which more surely enables a communication with the other device(s) while saving the power consumption even in the case where the communication device communicates with a plurality of devices.

DETAILED DESCRIPTION OF PREFERRED EMBODIMENTS

Embodiments will be described below in detail with reference to the drawings as required. However, unnecessarily detailed description may be omitted. For example, detailed description of already known matters and redundant description of substantially the same configuration may be omitted. All of such omissions are for facilitating understanding by those skilled in the art by preventing the following description from becoming unnecessarily redundant. The attached drawings and the following description are provided for those skilled in the art to fully understand the present disclosure and are not intended to limit the subject described in the claims.

First Embodiment

1-1. Configuration

A configuration of a system of the present disclosure as well as configurations of a digital camera and a smart phone which compose the system will be described below with reference to the drawings.

1-1-1. System Configuration

Figure 1:
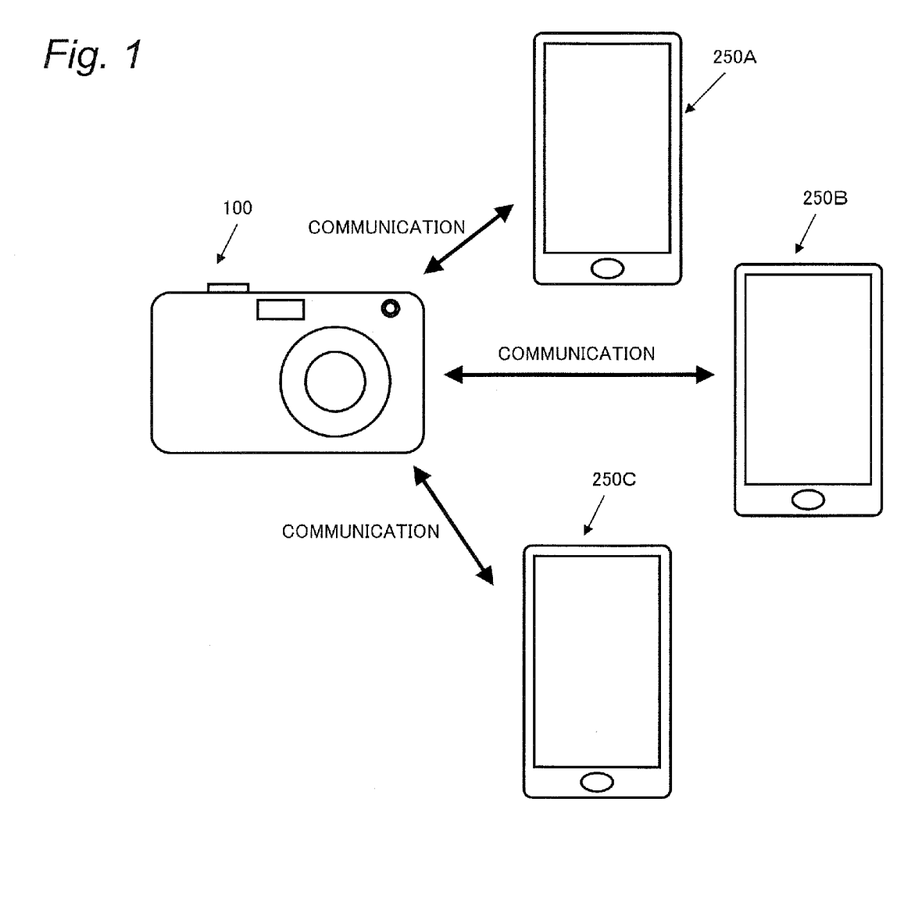
FIG. 1 is a diagram of a system block including a digital camera and smart phones.

The configuration of the system made of a digital camera and a smart phone according to the first embodiment will be described below with reference to FIG. 1. FIG. 1 is a block diagram of a system according to the first embodiment.

The digital camera 100 according to the first embodiment has an access point function (relay function) which can simultaneously establish communications between a digital camera 100 and N communication devices (N is an integral number of 1 or more) which can be, for example, a smart phone 250 (e.g., smart phones 250A to 250C) as shown in FIG. 1. In other words, in the above described case, each of the N communication devices can establish a communication with the digital camera 100 as its access point.

The digital camera 100 has a communicating unit 171 which can send data of an image displayed on a standby screen (hereinafter, referred to as "through image") and data of an image recorded on the recording medium (hereinafter, referred to as "recorded image") to the smart phone 250. On the other hand, the smart phone 250 has a communicating unit 254 which receives a through image and a recorded image sent from the digital camera 100.

When the smart phone 250 receives data of the through image from the digital camera 100, it can display the through image on a display unit of the smart phone 250. The digital camera 100 can also transfer the recorded image freshly generated by the shooting operation to the smart phone 250.

Although the "other communication device(s)" (electronic device(s)) for establishing a communication(s) with the digital camera 100 which has the access point function is exemplified by the smart phone 250 in the first embodiment, the other communication device(s) is not limited to that. The other communication device(s) may be an audio and video equipment such as, for example, a tablet terminal, a television receiver, or a recorder as far as it is a communication device available for establishing a communication with a digital camera which has the access point function.

Hereinafter, as one example, the device which has the access point function will be described as the digital camera 100 and the communication device(s) which can connect to the digital camera 100 which has the access point function will be described as the smart phone(s) 250.

1-1-2. Configuration of Digital Camera

Figure 2:
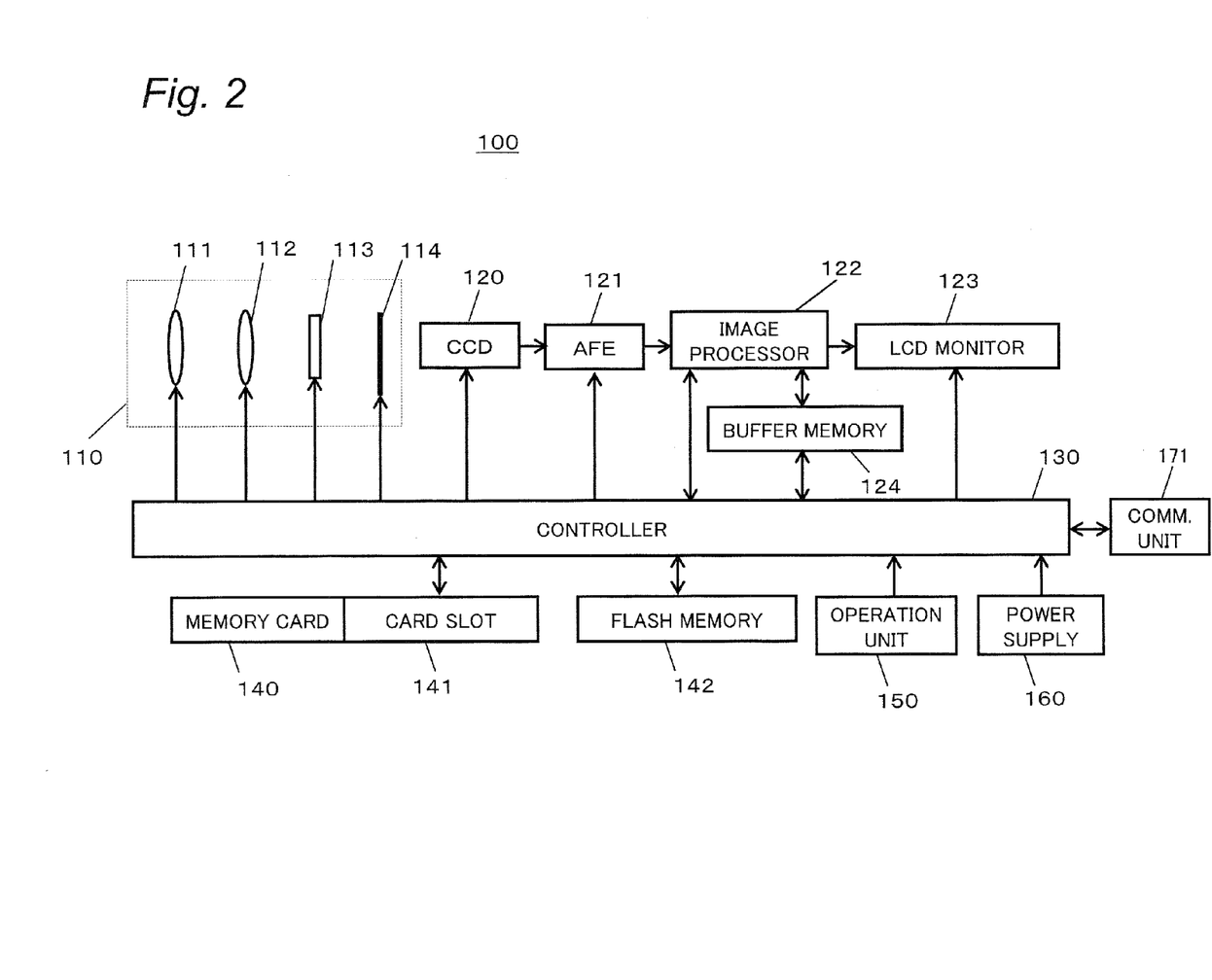
FIG. 2 is a diagram of an electric configuration of the digital camera.

FIG. 2 is a diagram of electrical configuration of the digital camera 100. The digital camera 100 captures a subject's image formed through an optical system 110 by a CCD image sensor 120. The CCD image sensor 120 generates captured data based on the captured subject's image. The generated captured data is subject to various processing by an AFE (Analog Front End) 121 and an image processor 122 to generate image data. The generated image data is recorded on a flash memory 142 or a memory card 140. The image data recorded on the flash memory 142 or the memory card 140 is displayed on a liquid crystal display (LCD) monitor 123 in response to the user's operation on an operation unit 150.

The optical system 110 includes a focus lens 111, a zoom lens 112, a diaphragm 113, a shutter 114, and so on. Although not shown, the optical system 110 may include an optical image stabilizer lens OIS. The optical system 110 may be composed of any number of lens or any number of lens groups.

The CCD image sensor 120 captures the subject's image formed through the optical system 110 and generates captured data. The CCD image sensor 120 generates a new frame of captured data at a predetermined frame rate (for example, 30 frames/second). The timing for the CCD image sensor 120 to generate captured data and an electronic shutter operation are controlled by a controller 130. With images based on the captured data successively displayed on the liquid crystal display monitor 123 as the through image, the user can confirm the subject's condition on the liquid crystal display monitor 123 in real time.

The AFE 121 performs noise suppression by correlated double sampling, multiplication of gain based on the ISO sensitivity with an analog gain controller, and A/D conversion with an AD converter on the imaging data read out from the CCD image sensor 120. Then, the AFE 121 outputs the image data to the image processor 122.

The image processor 122 performs various types of processing on the imaging data output from the APE 121 to generate the image data. The various types of processing include, but not limited to, BM (block memory) accumulation, smear correction, white balance correction, gamma correction, YC conversion process, electronic zoom process, compression, and expansion. The image processor 122 may be made of a hardwired electronic circuit, or a microcomputer using a program. The image processing unit 122 may also be made into a single semiconductor chip together with the controller 130 and the like.

The liquid crystal display monitor 123 is provided on the back of the digital camera 100. The liquid crystal display monitor 123 displays an image based on the image data processed by the image processor 122. The liquid crystal display monitor 123 displays images such as the through image and the recorded image.

The controller 130 performs control over the operations of the entire digital camera 100. The controller 130 may be implemented by a hardwired electronic circuit, or may be implemented by a microcomputer or the like. The controller 130 may also be made into a single semiconductor chip together with the image processor 122 and the like.

The flash memory 142 functions as an internal memory for storing the image data and the like. The flash memory 142 stores programs related to autofocus control (AF control) and communication control as well as programs for performing control over the operations of the entire digital camera 100.

The buffer memory 124 is a storage unit that functions as a work memory for the image processor 122 and the controller 130. The buffer memory 124 can be implemented by a DRAM (Dynamic Random Access Memory) or the like.

The card slot 141 is a connecting unit for connecting detachably the memory card 140. The card slot 141 is capable of electrically and mechanically connecting with the memory card 140. The card slot 141 may have a function of controlling the memory card 140.

The memory card 140 is an external memory containing a storage element such as a flash memory. The memory card 140 is capable of recording data such as the image data to be processed in the image processor 122.

The communicating unit 171 is a wireless communication interface, for example, a communication module for implementing a wireless communication function. The controller 130 is capable of connecting to the Internet via the communicating unit 171. In the present embodiment, the communicating unit 171 is assumed as a communication module complying with the WiFi standard as an example. In the digital camera 100, the controller 130 is capable of implementing the access point function by executing a predetermined software program for the communication. The controller 130 of the digital camera 100 is capable of notifying the other communication devices (for example, the smart phones 250) of the presence of the digital camera 100 which is an access point by advertising the presence of the controller 130 via the communicating unit 171. When the other communication device (for example, the smart phone 250) recognizes the presence of the digital camera 100 which is an access point, the other communication device notifies the digital camera 100 of its communication ID for establishing a communication with the digital camera 100. As a result, the other communication device (for example, the smart phone 250) can establish a communication with the digital camera 100. Here, the user can set ON or OFF of the WiFi communication function on the digital camera 100. The state in which the WiFi communication function is set ON is referred to as "WiFi ON mode", and the state in which the WiFi communication function is set OFF is referred to as "WiFi OFF mode". In the WiFi ON mode, the controller 130 performs the control to establish a WiFi communication with the other electronic device through the communicating unit 254 to enable a data communication.

The power supply 160 supplies power to the respective components of the digital camera 100. The power supply 160 may be a battery or may be configured to be powered from the AC power supply via a cable.

The operation unit 150 is a collective term of members which receive a user's operation, and includes an operation button, an operation lever, a touch panel and the like provided on the exterior of the digital camera 100. When the operation unit 150 receives user's operations, it notifies the controller 130 of the respective operational instructing signals. The operation unit 150 includes a power switch for switching state of supplying power from the power supply 160 to the digital camera 100 between the ON state and the OFF state.

1-1-3. Configuration of Smart Phone

Figure 3:
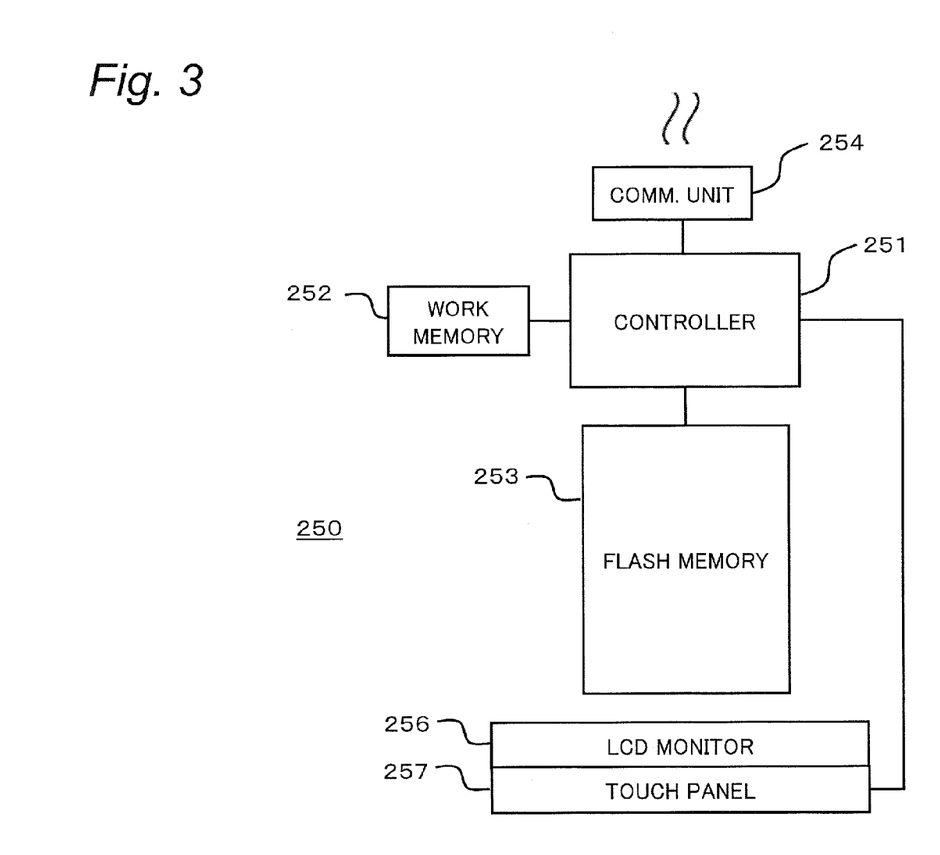
FIG. 3 is a diagram of an electric configuration of the smart phone.

Next, a configuration of the smart phone 250 will be described with reference to FIG. 3. FIG. 3 is a diagram of an electric configuration of the smart phone 250.

The smart phone 250 includes a controller 251, a work memory 252, a flash memory 253, the communicating unit 254, a liquid crystal display monitor 256, a touch panel 257, and the like. The smart phone 250 may include an image capturing unit or an image processor (not shown).

The controller 251 is a processing unit for performing processing of the smart phone 250. The controller 251 is electrically connected to the work memory 252, the flash memory 253, the communicating unit 254, the liquid crystal display monitor 256, and the touch panel 257. The controller 251 receives operational instructing signals according to user's operations on the touch panel 257. The controller 251 is capable of reading data stored in the flash memory 253. The controller 251 also globally controls the system including the power supplied to the respective components of the smart phone 250. Although not shown, the controller 251 executes a telephone function and various applications downloaded via the Internet.

The work memory 252 is a memory for temporarily storing information necessary for the controller 251 to execute various processes.

The flash memory 253 is a disk drive with a large capacity for storing various types of data. As described above, the various types of data stored in the flash memory 253 can be read out by the controller 251 as required. Although the smart phone 250 has the flash memory 253 in the present embodiment, it may have a hard disk drive or the like instead of the flash memory.

The liquid crystal display monitor 256 is a display device which displays a screen instructed by the controller 251.

The touch panel 257 is an input device for receiving user's operation information. Although the smart phone 250 has the touch panel 257 as an input device for receiving user's operation information in the present embodiment, it may have hard keys instead of the touch panel.

The communicating unit 254 is capable of recording image data received from the controller 251 on the flash memory 253 or sending the image data received from the controller 251 to the other device(s) via the Internet. Although the communicating unit 254 is assumed to perform communication based on the WiFi interface as an example in the present embodiment, the communication interface to which the idea of the present disclosure is applied is not limited to the WiFi and can be applied to other communication interfaces.

The controller 251 of the smart phone 250 can recognize the presence of the digital camera 100 having issued an "advertisement", by performing device search. When the smart phone 250 recognizes the presence of the digital camera 100 as an access point, the smart phone 250 notifies the digital camera 100 of its communication ID for establishing a communication with the digital camera 100. Hence, the smart phone 250 can establish a communication with the digital camera 100.

1-2. Operation

Figure 4:
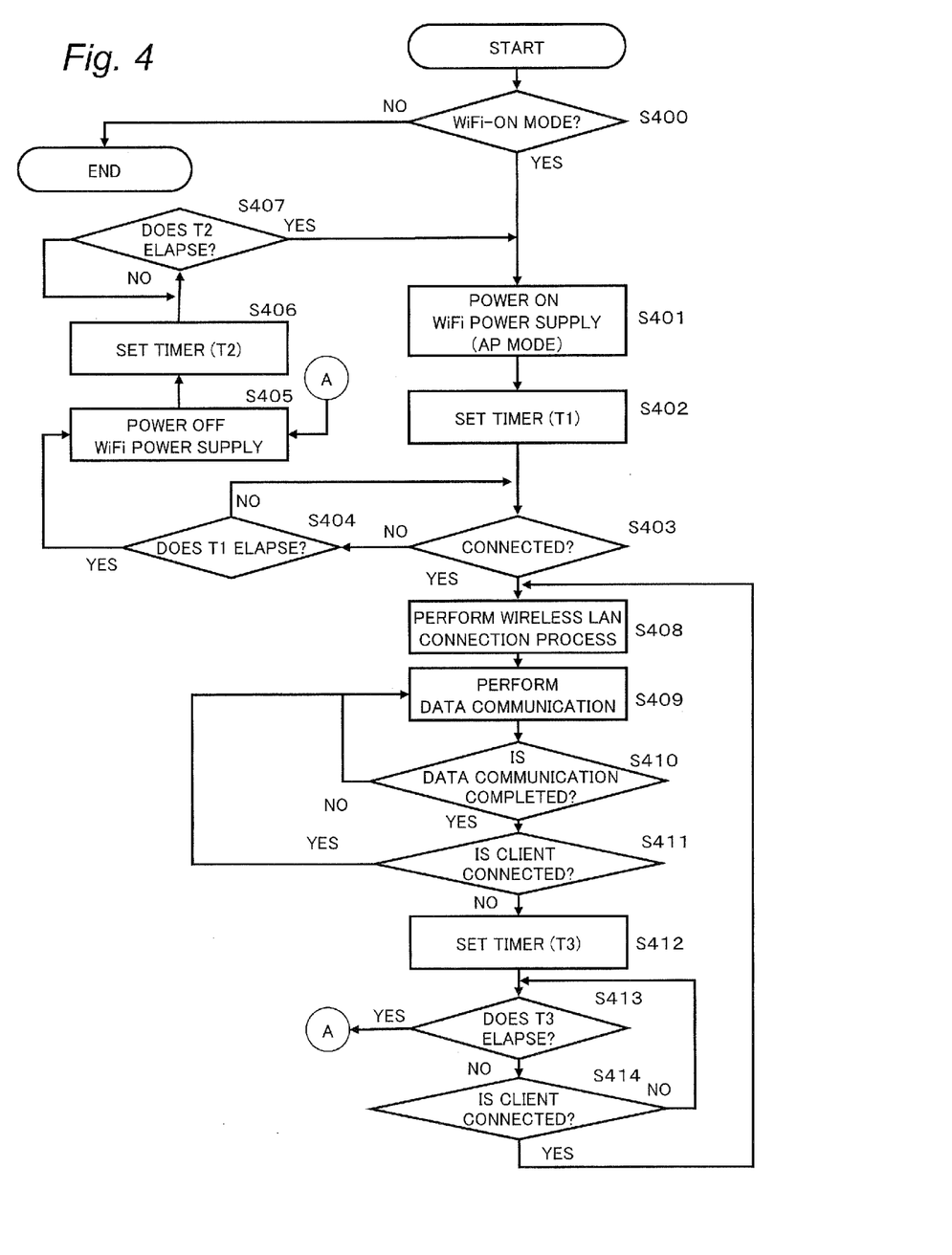
FIG. 4 is a flow chart of a communication operation of the digital camera.

The intermittent operation on supply of power to the communicating unit 254 in the digital camera 100 having the access point function will be described below with reference to FIG. 4. FIG. 4 is a flow chart of a communication operation of the digital camera 100.

When the controller 130 receives a user's operation on the operation unit 150 to turn on the digital camera 100, the controller 130 starts supplying of power from the power supply 160 to the respective units of the digital camera 100. The controller 130 determines whether the digital camera 100 needs to perform a WiFi communication or not (i.e., whether the digital camera 100 is in the WiFi ON mode or not) (S400).

When the digital camera 100 is not in the WiFi ON mode (i.e., when the digital camera 100 does not need to perform a WiFi communication), the controller 130 terminates the processing shown in FIG. 4 (No in step S400). Here, the ON/OFF setting of the WiFi function (WiFi ON mode/WiFi OFF mode) has been set previously on the digital camera 100 by the user.

On the other hand, when the digital camera 100 is in the WiFi ON mode or when the digital camera 100 becomes in the WiFi ON mode (i.e., when the digital camera 100 is to perform a WiFi communication), the controller 130 supplies power to the communicating unit 171 to turn on a power supply for the WiFi communication (S401). Then, the controller 130 executes a program for controlling the communicating unit 171 to activate an access point function. When the access point function is activated, the controller 130 issues an "advertisement" through the communicating unit 171 to notify peripheral communication devices of presence of the digital camera 100.

When the power supply for the WiFi communication through the communicating unit 171 is turned on, the controller 130 sets a timer for a first time period (T1 seconds) (S402). Then, the controller 130 starts measuring the time from 0 second with the timer setting of the first time period (T1 seconds).

The peripheral communication devices (the other communication devices) recognize presence of a network of the digital camera 100 by receiving the advertisement from the digital camera 100. That is, the smart phone(s) 250 recognizes the presence of a network of the digital camera 100. The controller 251 of the smart phone 250 can notify (send) the digital camera 100 of a connection request together with the communication ID through the communicating unit 254 to establish a connection state (i.e., establish the WiFi communication) with the digital camera 100. The controller 130 of the digital camera 100 monitors reception of the connection request sent together with the notification of the communication ID from the other communication device (client apparatus such as the smart phone 250) (S403). The digital camera 100 has activated the access point function, and therefore the digital camera 100 is ready to simultaneously establish connection states with the plurality of the other communication devices (client apparatuses such as the smart phones 250). In other words, the digital camera 100 which has activated the access point function is notified of the connection requests with the notified communication IDs from the plurality of other communication devices, so that the digital camera 100 can establish a plurality of connection states (i.e., the WiFi communications) with the plurality of other communication devices. Therefore, in step S403, when receiving a connection request from at least one of a plurality of other communication devices (client devices such as the smart phones 250), the controller 130 of the digital camera 100 determines that there is a connection request.

When the controller 130 determines that no connection request has been sent from any of the other communication devices (client devices such as the smart phones 250) in step S403, it determines whether the first time period (T1 seconds) has elapsed from the start of time measurement after the timer setting in step S402 (S404). When the first time period (T1 seconds) has not elapsed yet (No in step S404), the controller 130 returns the processing to step S403. When the first time period (T1 seconds) has elapsed (Yes in step S404), the controller 130 turns off the power supply for the WiFi communication (S405). That is, the controller 130 stops the supplying of power to the communicating unit 171.

When the power supply for the WiFi communication through the communicating unit 171 is turned off, the controller 130 sets the timer for a second time period (T2 seconds) (S406). Then, the controller 130 starts measuring the time from 0 second with the timer setting of the second time period (T2 seconds). Then, the controller 130 determines whether the second time period (T2 seconds) has elapsed from the start of time measurement in step S406 (S407). The controller 130 repeats the determination of step S407 (No in step S407) until the second time period (T2 seconds) elapses. When the second time period (T2 seconds) has elapsed, the controller 130 resumes the supplying of power to the communicating unit 171 to turn on the power supply for the WiFi communication (S401). Then, the controller 130 executes a program for controlling the communicating unit 171 to activate the access point function. When the access point function is activated, the controller 130 issues an advertisement via the communicating unit 171 to notify the peripheral communication devices of presence of the digital camera 100. Then, the controller 130 performs the processing of step S402 and step S403 again.

As described above, the controller 130 of the digital camera 100 keeps the power on state of the WiFi communication for the first time period (T1 seconds) after the power supply for the WiFi communication is turned on. When no connection request is sent from the other communication device(s) (client device(s) such as the smart phone(s) 250) within the first time period (T1 seconds) after the power supply for the WiFi communication is turned on and the time measurement started, the controller 130 switches to the power off state of the WiFi communication and then keeps the power off state of the second time period (T2 seconds). Afterward, when the second time period (T2 seconds) elapses, the controller 130 turns on the power supply for the WiFi communication again. As such, in the present embodiment, the operation of controlling the power state of the WiFi communication to be intermittently turned on is repeated. That is, when a connection request(s) is not sent from the other communication device (s), the digital camera 100 can turn off the power supply for the WiFi communication and subsequently it can turn on the power supply for the WiFi communication so that the digital camera 100 can receive another connection from the other communication device. In this manner, the digital camera 100 can wait for a connection from the other communication device(s) while saving power as much as possible.

When the controller 130 determines that a connection request has been sent from at least one of the other communication devices (client devices such as the smart phones 250) in step S403, the controller 130 performs processing for wireless connection with the smart phone 250 based on the communication ID notified with the connection request from the smart phone 250 (S408). More specifically, the controller 130 performs authentication processing based on the communication ID notified from the smart phone 250 to establish a connection between the digital camera 100 and the smart phone 250.

When the controller 130 of the digital camera 100 finishes the wireless connection processing in step S408, the controller 130 performs data transmission processing to the smart phone(s) 250 through the communicating unit 171 (S409). The controller 130 of the digital camera 100 monitors if the data transmission is completed (S410). The controller 130 of the digital camera 100 continues the data transmission processing to the smart phone(s) 250 (No in S410) until the data transmission completes.

When the controller 130 of the digital camera 100 determines that the data transmission to the smart phone 250 has completed (Yes in S410), the controller 130 determines whether the digital camera 100 is connected with any other communication device(s) (client device(s)) other than the smart phone 250 which has completed the data transmission (S411). The controller 130 of the digital camera 100 manages information on the communication device (client device) from which a connection request is received and with which the connection has been established. When the controller 130 receives a disconnection request from the other communication device (client device), the controller 130 updates the managed information and disconnects the digital camera 100 from the communication device which has sent the disconnection request. Alternatively, when the controller 130 has not received a reply from the other communication device in response to a connection confirmation notification from the digital camera 100, the controller 130 updates the managed information and disconnects the digital camera 100 from the communication device which has not sent the reply. Then, the controller 130 can recognize whether the digital camera 100 is connected with the other communication device by analyzing the managed information.

When the connection with the other communication device (client device(s)) is kept, the controller 130 of the digital camera 100 performs the operations of steps S409 and S410 as required. Then, the controller 130 performs the determination as defined in step S411 again.

On the other hand, when the controller 130 of the digital camera 100 determines that the digital camera 100 is not connected with any of the other communication devices (client devices) (NO in S411), the controller 130 sets the timer for a third time period (T3 seconds) (S412). Then, the controller 130 starts measuring the time at 0 second with the timer setting of the third time period (T3 seconds). Subsequently, the controller 130 determines whether the third time period (T3 seconds) has elapsed from the start of time measurement (S413). When the third time period has not elapsed yet, the controller 130 determines whether another connection request is received from the other communication device(s) (client device(s)) including the smart phone(s) 250 (S414). When another connection request is not received, the controller 130 repeats the determinations defined in step S413 and step S414 until the third time period (T3 seconds) has elapsed. When the third time period (T3 seconds) has elapsed without any other connection request received from the other communication device(s) (client device(s)), the controller 130 turns off the power supply for the WiFi communication (S405). That is, the controller 130 stops the supplying of power to the communicating unit 171. Thereafter, the controller 130 performs the operations after step S406 as described above. Although T3 seconds is set as the third time period in the present embodiment, the value equal to the first time period (T1 seconds) may be set to the third time period.

When determining that a connection request has been sent from at least one of the other communication device (client device such as the smart phone 250) in step S414, the controller 130 performs processing of wireless connection with the other communication device based on the communication ID notified with the connection request from the other communication device (S408). Thereafter, the controller 130 performs the operations after step S409 as described above.

As described above, when all of the other communication devices (client terminals) are disconnected from the digital camera 100, the digital camera 100 keeps the power ON state of the WiFi communication for the third time period (T3 seconds) to wait for another connection request(s) from the other communication device(s) (client terminal(s)). As a result, the digital camera 100 can perform a stable connection operation with the other communication devices (client terminals).

As described above, the digital camera 100 of the present embodiment has the communicating unit 171 which communicates with the smart phone(s) 250 (other electronic device (s)) and the controller 130 which controls supply of power to the communicating unit 171. The controller 130 intermittently controls supply of power to the communicating unit 171 by keeping supplying of power to the communicating unit 171 during the first time period (T1) and stopping the supplying of power to the communicating unit 171 during the second time period (T2). The controller 130 determines whether the smart phone(s) 250 is connected to the digital camera 100 through the communicating unit 171 within the first time period (T1). When the smart phone(s) 250 is connected to the digital camera 100 through the communicating unit 171 within the first time period (T1), the controller 130 controls the supplying of power to the communicating unit 171. On the other hand, when the smart phone(s) 250 is not connected to the digital camera 100 through the communicating unit 171 within the first time period (T1), the controller 130 stops the supplying of power to the communicating unit 171 during the second time period (T2) after elapse of the first time period (T1).

The intermittent power-on of the communicating unit 171 in the digital camera 100 which has not established a communication with the other electronic device(s) allows the digital camera 100 having an access point function to surely receive a communication connection request from the other electronic device(s) while saving power consumption.

Other Embodiments

As described above, the first embodiment has been discussed as an example of the technology disclosed in the present application. However, the technology in the present disclosure is not limited to that embodiment and may also be applied to embodiments which are subject to modification, substitution, addition, or omission as required. The other embodiments will be exemplified below.

In the above described embodiment, according to the user's On/OFF setting of the WiFi function, the digital camera 100 enters the WiFi ON mode. However, the present disclosure is not limited to that. In other words, the digital camera 100 may be configured to automatically turn on the WiFi function according to a predetermined condition. Specifically, the digital camera 100 may be configured to automatically enter the WiFi ON mode in a shooting mode at the timing a user's operation is made for shooting a still image or a moving image. With this arrangement, the digital camera 100 only needs to supply power to the communicating unit 171 when a new still image or a new moving image is generated, and thus more effective power saving can be expected. Alternatively, the digital camera 100 may be configured to enter WiFi ON mode when images to be sent are selected on the camera. With this arrangement, the digital camera 100 only needs to supply power to the communicating unit 171 when there are images to be sent, and thus more effective power saving can be expected.

Further, when the digital camera 100 is in the WiFi ON mode when an operation is made to turn off the power supply of the main body of the digital camera 100, the controller 130 may perform the operation along the flowchart shown in FIG. 4 by stopping the supplying of power to members which are not related to communication and only keeping the supply of power to members which are related to communication. As a result, the digital camera 100 can connect with the other communication device(s) (client device(s)) which sends a connection request to the digital camera 100 acting as an access point, even though a user's operation is made to turn off the main body of the digital camera 100.

Figure 5:
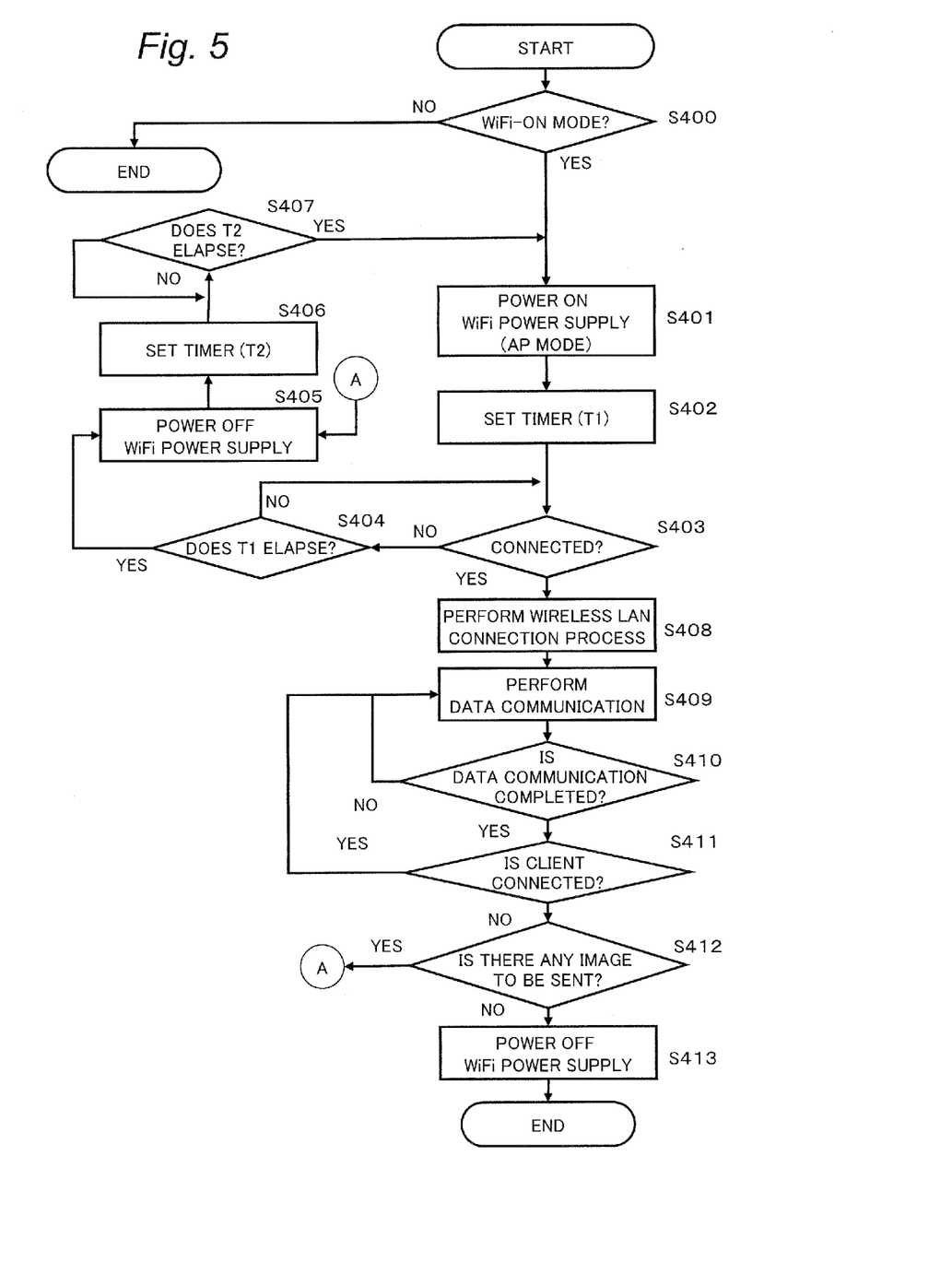
FIG. 5 is a flow chart of a communication operation of the digital camera according to another embodiment.

In the above described embodiment, as shown in FIG. 4, the power state of the WiFi communication is kept powered on for the third time period (T3 seconds) when all of the other communication devices (client devices) are disconnected from the digital camera 100 in step S411. However, as shown in FIG. 5, the digital camera 100 may be configured to determine whether it has an image(s) to be sent to the other communication device(s) (S412) when the digital camera 100 is disconnected from all of the other communication devices (client devices) in step S411. When the digital camera 100 has an image(s) to be sent (No in S412), the controller 130 may perform the operations defined in step S405 and thereafter, to intermittently power on the WiFi communication so that the controller 130 may wait for a connection request from the other communication device(s). On the other hand, when digital camera 100 does not have any images to be sent (Yes in S412), the controller 130 may immediately turn off the power supply for the WiFi communication (S413).

In the above described embodiment, the digital camera 100 may be configured to change the time interval of the intermittent operation according to the number of the other communication device(s) (client device(s)) previously connected to the digital camera 100 when it is determined that the digital camera 100 is not connected with the other communication device(s) (client device(s)) (No in S403) in S403 shown in FIG. 4. That is, the controller 130 may change the second time period according to the number of the other communication device(s) (client device(s)) which is (are) previously connected to the digital camera 100. As a result, the digital camera 100 can flexibly change the second time period, which is the time interval of the intermittent operation, according to the number of the other communication device (s) (client device(s)) previously connected to the digital camera 100. More specifically, the second time period may be set shorter as the number of the other communication device(s) (client device(s)) previously connected to the digital camera 100 is the larger. It can be considered that when the number of the other communication device(s) (client device(s)) previously connected to the digital camera 100 is large, the possibility that the digital camera 100 will receive another connection request(s) becomes high. Therefore, the second time period may be shorter as the number of the other communication device(s) previously connected to the digital camera 100 is larger. On the other hand, when the number of the other communication device(s) (client device(s)) previously connected to the digital camera 100 is small, the possibility that the digital camera 100 will receive another connection request(s) is low. Therefore, the second time period can be increased for saving power consumption.

In the above described embodiment, the digital camera 100 may be configured to increase stepwise the second time period, which is the time interval of the intermittent operation, according to the number of repetitions of the intermittent operation when the digital camera 100 is not connected with the other communication device(s) (client device(s)) after repeating the intermittent operation from step S400 to step S407 shown in FIG. 4. That enables the digital camera 100 to further save the power consumption. Also, the digital camera 100 may be configured to reset the second time period, which is the time interval of the intermittent operation, to the time period of an initial setting (an initially set time period before the second time period is increased) when the digital camera 100 is connected with the other communication device(s) (client device(s)) again in the above described case. That enables the digital camera 100 to respond to a connection request(s) from the other communication device(s) (client device(s)).

Further, in the above described embodiment, the digital camera 100 may be configured to notify the other communication device(s) (client device(s)) including the smart phone (s) 250 that the digital camera 100 is to perform the intermittent operation of the supply of power to the communicating unit 171. On that occasion, the digital camera 100 also may notify the time interval of the intermittent operation (the second time period). With this arrangement, even though the communicating unit 171 of the digital camera 100 is in the power off state when the controller 251 of the smart phone 250 sends a connection request to the digital camera 100, the controller 251 can notify the digital camera 100 of a connection request again at an appropriate timing based on previously obtained information on the intermittent operation of the digital camera 100.

In the above described embodiment, the determination on a connection between the digital camera 100 and the other communication device(s) (steps S403, S411, S414 in the flows of FIG. 4, FIG. 5) is based on establishment/unestablishment of the WiFi communication between the digital camera 100 and the other communication device(s). However, the determination on a connection is not limited to that. For example, the digital camera 100 may be configured to determine that it is not connected with the other communication device(s) based on the fact that data communication caused by an application is not performed between the digital camera 100 and the other communication device(s) for a predetermined time period when the WiFi communication is established between the digital camera 100 and the other communication device(s) in steps S403, S411, and S414.

The idea of the present disclosure is not limited to the digital camera. That is, the idea of the present disclosure may be applied to any device such as a smart phone and a tablet terminal as far as the device has a communication function to be able to communicate information including an image. In the case where the idea of the present disclosure is applied to the digital camera, it can be applied not only to a lens integrated camera but also to a lens detachable camera.

The embodiments have been described above as examples of the technology of the present disclosure. For those purposes, the accompanying drawings and the detailed description have been provided.

Therefore, the constituent elements shown or described in the accompanying drawings and the detailed description may include not only the constituent element necessary to solve the problem but also the constituent element unnecessary to solve the problem in order to exemplify the technology. Accordingly, it should not be instantly understood that the unnecessary constituent element is necessary only because the unnecessary constituent element is shown or described in the accompanying drawings and the detailed description.

Also, since the above described embodiments are for exemplifying the technology of the present disclosure, various changes, substitutions, additions, omissions and the like may be performed on the embodiments without departing from the scope of the claims and the equivalent of the claims.

INDUSTRIAL APPLICABILITY

The present disclosure can be applied to a communication device which can communicate information including an image.

What is claimed is:

1. A communication device, comprising:
an image capturing unit having an image sensor configured to capture an image of a subject;
an operation unit having a user manipulated input device configured to receive a user input;
a communicating unit having a communication interface, wherein the communication interface communicates with another electronic device; and
a controller configured to control a supply of power to the communicating unit, wherein
the controller:
intermittently controls the supply of power to the communicating unit by keeping the supply of power to the communicating unit during a first time period and stopping the supply of power to the communicating unit during a second time period, and
determines whether the other electronic device is connected to the communication device through the communicating unit within the first time period,
when the other electronic device is connected to the communication device through the communicating unit within the first time period, the controller keeps the supply of power to the communicating unit,
when the other electronic device is not connected to the communication device through the communicating unit within the first time period, the controller stops the supply of power to the communicating unit during the second time period after the first time period elapses; and
when the supply of power to the communicating unit is stopped, the controller automatically starts the supply of power to the communication unit according to at least one of the following predetermined conditions:
the image capturing unit captures the image of the subject; or
the operation unit receives a user input for selecting a captured image to be sent to the other electronic device.

2. The communication device according to claim 1, wherein
when the supply of power to the communicating unit is kept and a plurality of other electronic devices to the communication device through the communicating unit within the first time period, the controller stops the supply of power to the communicating unit during the second time period, after the communication device is disconnected from all of the plurality of other electronic devices.

3. The communication device according to claim 2, wherein
after the communication device is disconnected from all of the plurality of other electronic devices, the controller keeps the supply of power to the communicating unit until a third time period elapses, and stops the supply of power to the communicating unit during the second time period after the third time period elapses.

4. The communication device according to claim 1, wherein the controller adjusts a length of the second time period according to a number of other electronic devices which are previously connected to the communication device through the communicating unit.

5. The communication device according to claim 4, wherein
the controller sets the length of the second time period to be shorter as the number of other electronic devices previously connected to the communication device increases.

6. The communication device according to claim 1, wherein
when the communication device is not connected to the other electronic device after repeating the operations of keeping and stopping the supply of power to the communicating unit a predetermined number of times, the controller increases stepwise a length of the second time period according to the predetermined number of times.

7. The communication device according to claim 6, wherein the controller resets the length of the second time period to an initial value when the communication device is connected to the other electronic device.

8. The communication device according to claim 1, further comprising
an informing unit configured to notify the other electronic device that the communication device is to perform the intermittent operation of the supply of power to the communicating unit.

9. The communication device according to claim 1, wherein the communication device has an access point function.

10. The communication device according to claim 1, wherein the communication device is a digital camera.

11. The communication device according to claim 10, wherein the communicating unit communicates with the other electronic device via a wireless communication.

12. The communication device according to claim 11, wherein the communicating unit performs the wireless communication according to a WiFi standard.

* * * * *